United States Patent
Inose et al.

(10) Patent No.: US 11,459,804 B2
(45) Date of Patent: Oct. 4, 2022

(54) FORWARD/BACKWARD MOVEMENT DEVICE

(71) Applicant: HI-LEX CORPORATION, Hyogo (JP)

(72) Inventors: Yuji Inose, Tochigi (JP); Hiroshi Sonobe, Tochigi (JP)

(73) Assignee: HI-LEX CORPORATION, Hyogo (JP)

( * ) Notice: Subject to any disclaimer, the term of this patent is extended or adjusted under 35 U.S.C. 154(b) by 208 days.

(21) Appl. No.: 16/624,404

(22) PCT Filed: Jun. 29, 2018

(86) PCT No.: PCT/JP2018/024789
§ 371 (c)(1),
(2) Date: Dec. 19, 2019

(87) PCT Pub. No.: WO2019/004423
PCT Pub. Date: Jan. 3, 2019

(65) Prior Publication Data
US 2020/0123817 A1  Apr. 23, 2020

(30) Foreign Application Priority Data

Jun. 30, 2017  (JP) .............................. JP2017-128691

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05B 81/18* (2013.01); *E05B 85/24* (2013.01);
(Continued)

(58) Field of Classification Search
CPC .......... E05B 83/34; E05B 81/18; E05B 85/24; B60K 15/05; B60K 2015/053;
(Continued)

(56) References Cited

U.S. PATENT DOCUMENTS

2016/0108648 A1   4/2016  Hyun et al.
2016/0375762 A1*  12/2016  Lee ..................... B60K 15/05
                                                    296/97.22
(Continued)

FOREIGN PATENT DOCUMENTS

JP   2012077507     4/2012
JP   2015209689    11/2015
(Continued)

OTHER PUBLICATIONS

International Search Report and Written Opinion from PCT/JP2018/024789 dated Sep. 4, 2018 with English translation of Search Report.

*Primary Examiner* — Christine M Mills
*Assistant Examiner* — Yahya Sidky
(74) *Attorney, Agent, or Firm* — Calfee, Halter & Griswold LLP

(57) ABSTRACT

The forward/backward movement device includes: a case; a forward/backward member, and a drive mechanism. In the forward/backward movement device, the drive mechanism includes: a drive section including a drive section main body and a drive shaft; a gear section; an arm section; and a lock portion including a conversion mechanism and an engaging section. In the forward/backward movement device, the forward/backward member and the drive section are housed in the case such that respective axes of the forward/backward member and the drive section are substantially parallel to each other, and the arm section includes a rotation axis, in which a plane containing a rotation direction of the arm section with the rotation axis is substantially parallel with (Continued)

respect to a plane containing an axial direction of the drive section and an axial direction of the forward/backward member.

6 Claims, 14 Drawing Sheets

(51) Int. Cl.
  *E05B 81/18* (2014.01)
  *E05B 85/24* (2014.01)
  *E05C 5/02* (2006.01)
  *E05F 1/10* (2006.01)
(52) U.S. Cl.
  CPC ............... *E05C 5/02* (2013.01); *E05F 1/105* (2013.01); *B60K 2015/053* (2013.01); *B60K 2015/0561* (2013.01); *E05Y 2201/43* (2013.01); *E05Y 2201/71* (2013.01); *E05Y 2900/534* (2013.01)
(58) Field of Classification Search
  CPC .... B60K 2015/0561; B60K 2015/0507; B60K 2015/0501; B60K 2015/0538; B60K 2015/0546; E05C 5/02; E05F 1/05; E05Y 2201/43; E05Y 2201/71; E05Y 2900/534; Y10S 292/04; Y10S 292/11
  USPC ........................................ 292/201; 269/97.22
  See application file for complete search history.

(56) References Cited

U.S. PATENT DOCUMENTS

2017/0043660 A1  2/2017  Junpei et al.
2018/0266151 A1  9/2018  Hiroshi

FOREIGN PATENT DOCUMENTS

| JP | 2016079790 | 5/2016 | |
| JP | 2016142040 | 8/2016 | |
| JP | 2016223150 | 12/2016 | |
| WO | WO-2015162861 A1 * | 10/2015 | .............. E05F 1/105 |

* cited by examiner

FORWARD/BACKWARD MOVEMENT DEVICE

RELATED APPLICATIONS

The present application is a 35 U.S.C. 371 U.S. national stage application entry of PCT International Application No. PCT/JP2018/024789, filed on Jun. 29, 2018, which claims the benefit of Japanese Patent Application No. 2017-128691, filed Jun. 30, 2017, the entire disclosures of which are incorporated herein by reference.

TECHNICAL FIELD

The present invention relates to a forward/backward movement device including a case and a forward/backward member capable of moving forward and backward with respect to the case.

BACKGROUND ART

In vehicles, such as automobiles, forward/backward movement devices each configured to move a forward/backward member forward and backward between a pushed-in position where a fuel lid is closed and a pushed-out position where the fuel lid is opened have been used in opening/closing apparatuses for fuel lids each covering a filler port (e.g., see, Patent Literature (hereinafter, referred to as "PTL") 1).

In this forward/backward movement device, a lock portion is provided in a position adjacent to the forward/backward member so as to engage with the forward/backward member and thereby to restrict movement of the forward/backward member, and a drive section for rotating a worm wheel which moves this lock portion is provided on a side opposite to the forward/backward member with respect to this worm wheel. For this reason, housing in a flat rectangular housing portion is easy because of the flat structure.

CITATION LIST

Patent Literature

PTL 1
Japanese Patent Application Laid-Open No. 2016-142040

SUMMARY OF INVENTION

Technical Problem

The forward/backward movement device as described above, however, requires a horizontal width in the housing portion because of the flat structure, and thus, housing in a housing portion having a short horizontal width and a large size in thickness direction or in a housing space having a thickness in a center portion and/or near the center portion is difficult.

An object of the present invention is to provide a forward/backward movement device capable of being housed even in a narrow housing space.

Solution to Problem

A forward/backward movement device of the present invention includes:
a case;
a forward/backward member which moves forward and backward with respect to the case; and
a drive mechanism which locks the forward/backward member, in which
the drive mechanism includes:
a drive section including a drive section main body and a drive shaft;
a gear section which rotates, by rotation of the drive shaft, in a direction substantially perpendicular with respect to the drive shaft, as a rotation axis;
an arm section which rotates by rotation of the gear section; and
a lock portion including a conversion mechanism and an engaging section, the conversion mechanism being configured to change rotation of the arm section into linear motion, the engaging section being a section to be engaged with the forward/backward member, in which
the forward/backward member and the drive section are housed in the case such that respective axes of the forward/backward member and the drive section are substantially parallel to each other, and
the arm section includes a rotation axis, wherein a plane containing a rotation direction of the arm section with the rotation axis is substantially parallel with respect to a plane containing an axial direction of the drive section and an axial direction of the forward/backward member.

Advantageous Effects of Invention

According to the present invention, a forward/backward movement device capable of being housed even in a housing space which is narrow in width direction can be provided.

DESCRIPTION OF EMBODIMENTS

An embodiment of the present invention will be described below in detail with reference to the drawings.

A forward/backward movement device according to the present embodiment moves a forward/backward member forward and backward with respect to a case, and although a fuel lid opening/closing apparatus is mentioned as one application example, the forward/backward movement device according to the present embodiment may be applied to an apparatus different from a fuel lid opening/closing apparatus.

[Opening/Closing Apparatus 100 to which Forward/Backward Movement Device 1 is Applied]

Figure 1:
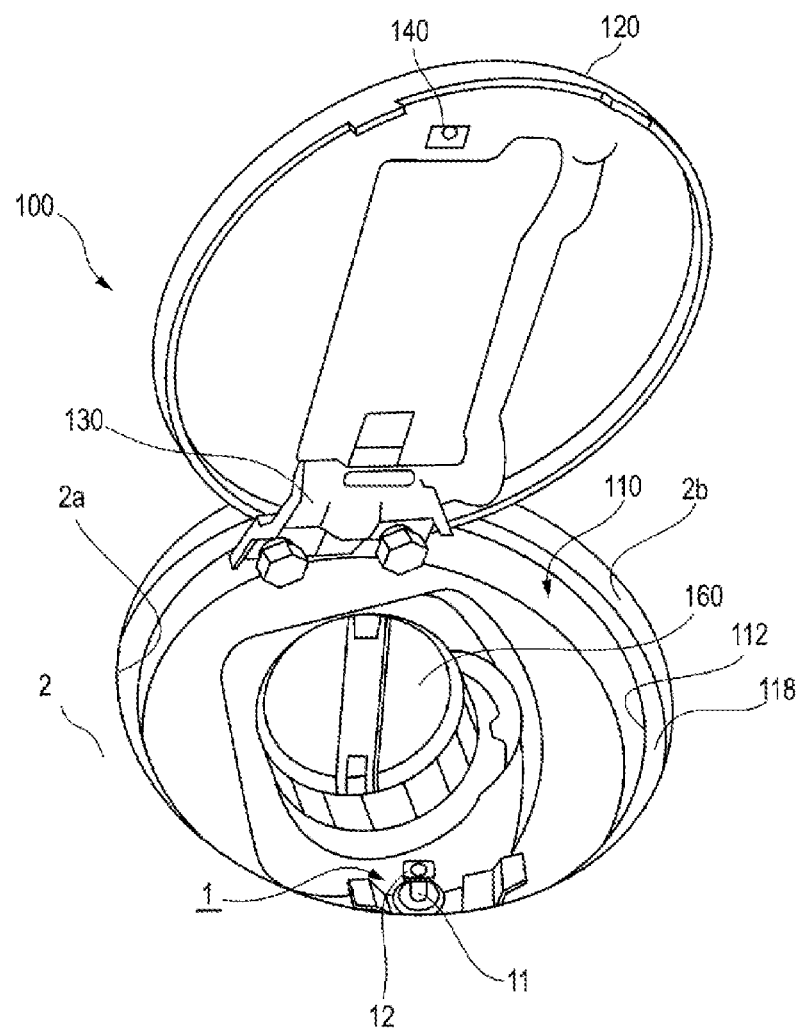
FIG. 1 is a perspective view of a configuration in which a forward/backward movement device according to an embodiment of the present invention is applied to a fuel lid opening/closing apparatus.
Figure 2:
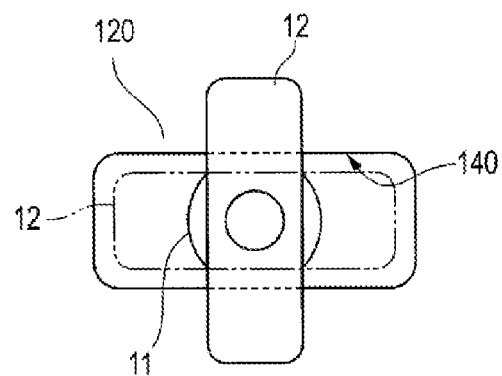
FIG. 2 is a diagram for describing the relationship between a latching section of a forward/backward member and a latched section of a fuel lid.

As illustrated in FIG. 1, opening/closing apparatus 100 is an apparatus that opens and closes a lid for an opening that houses a filler port of a vehicle, and forward/backward movement device 1 according to the present embodiment is applied to this opening/closing apparatus 100. Opening/closing apparatus 100 is a so-called fuel inlet box and is an apparatus to be installed at filler opening portion 2a of vehicle body 2 for pumping fuel into a fuel tank of the vehicle.

Opening/closing apparatus 100 includes: box main body 110 to be attached to filler opening portion 2a of vehicle body 2; fuel lid 120 which is a lid for covering filler opening portion 2a; hinge 130 which pivotably supports fuel lid 120; and forward/backward movement device 1.

Figure 3:
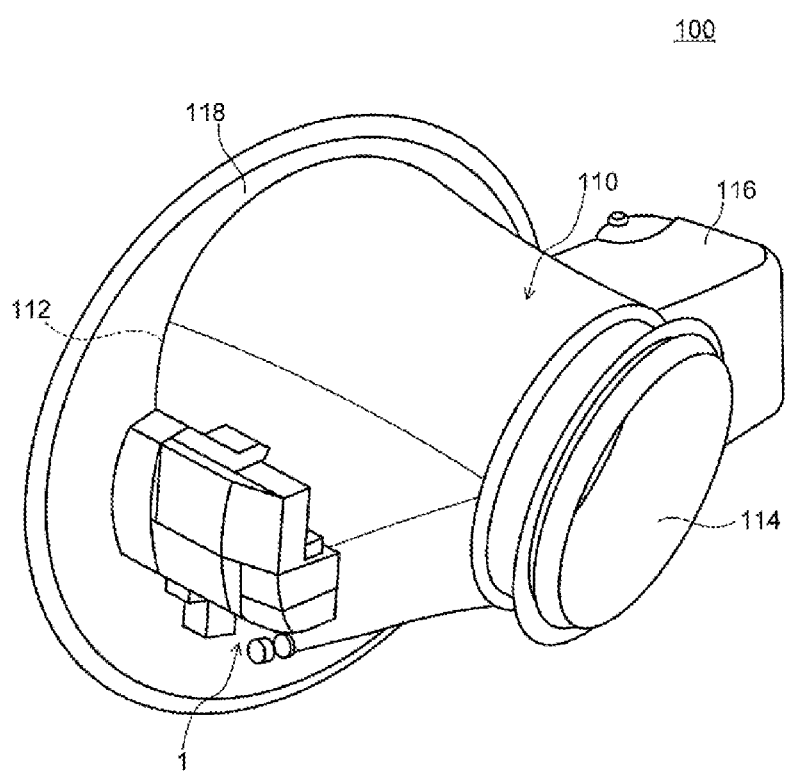
FIG. 3 is a diagram illustrating the fuel lid opening/closing apparatus illustrated in FIG. 1, as viewed from a rear side.
Figure 4:
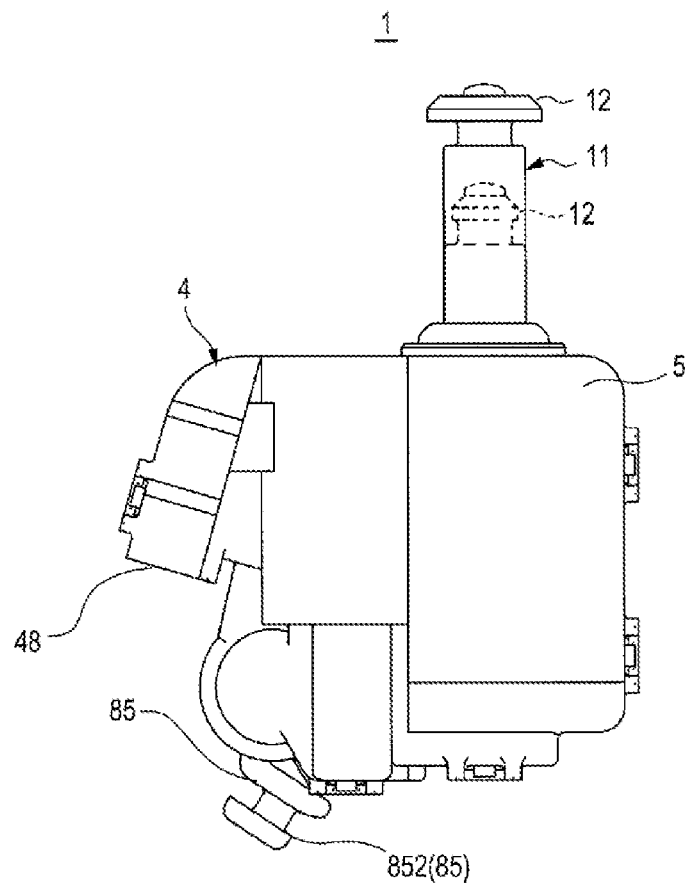
FIG. 4 is a front view of the forward/backward movement device according to the embodiment of the present invention.
Figure 5:
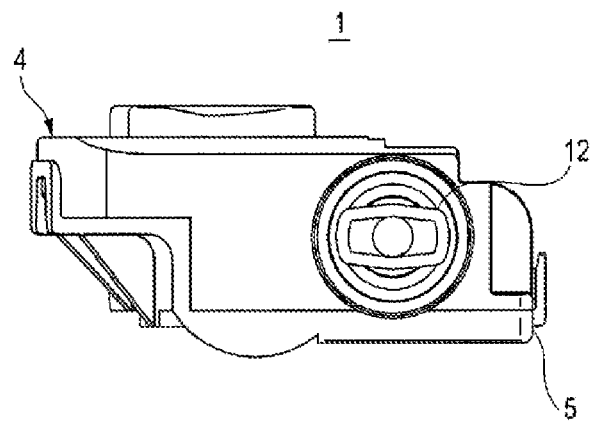
FIG. 5 is a plan view of the forward/backward movement device according to the embodiment of the present invention.
Figure 6:
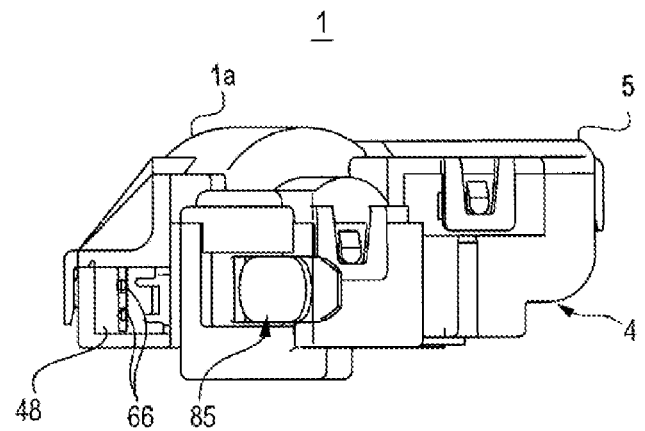
FIG. 6 is a bottom view of the forward/backward movement device according to the embodiment of the present invention.
Figure 7:
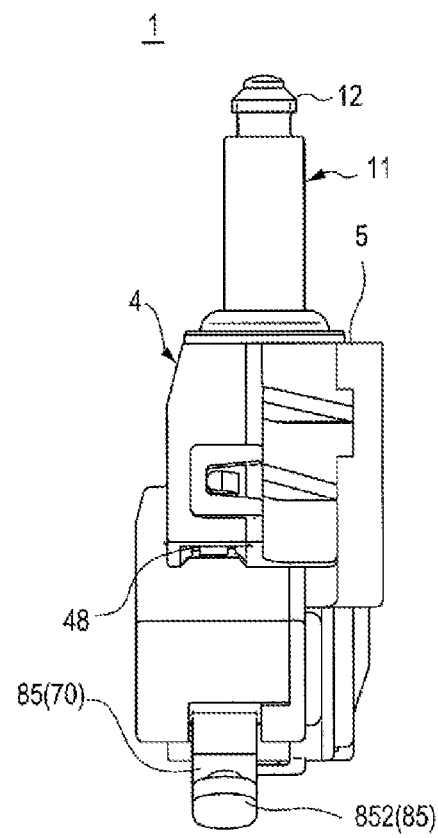
FIG. 7 is a left side view of the forward/backward movement device according to the embodiment of the present invention.

Box main body 110 is attached to filler opening portion 2a and thus becomes a fueling chamber which surrounds a filler tube on a side of the filler port. As illustrated in FIG. 1 and FIG. 3, box main body 110 is formed in a cylindrical shape, and opening 112 among two openings 112 and 114 is contiguously attached to filler opening portion 2a, and one end portion of the filler tube (not illustrated) is fittingly inserted into opening 114, which is the other opening. One end portion of the filler tube is disposed so as to protrude into box main body 110 and has a filler opening. As illustrated in FIG. 1, the filler opening is closed by screw cap 160. Screw cap 160 is removable at the time of refueling.

Flange 118 is provided at an edge portion of opening 112 of box main body 110, and this flange 118 is fixed to a circumferential edge portion of filler opening portion 2a. In this embodiment, the circumferential edge portion of filler opening portion 2a is annular surface portion 2c (see FIG. 17) which is positioned in a shape recessed to the inner side of vehicle body 2 relative to an outer surface of vehicle body 2 so as to form step 2b with respect to the outer surface of vehicle body 2. Flange 118 is attached to this annular surface portion 2c from outside of the vehicle body. Further, box main body 110 includes supporting protrusion 116 which is provided so as to protrude outward and which supports hinge 130 to be disposed inside. Box main body 110 has a cylindrical shape and is formed such that an outer circumference of box main body 110 increases in diameter toward opening 112 on a side of filler opening portion 2a from opening 114 on a side of the filler tube. Forward/backward movement device 1 is provided in box main body 110 and has an overall shape having thin ends and a thick center so as to allow box main body 110 to be inserted without being caught by filler opening portion 2a with supporting protrusion 116 placed into filler opening portion 2a having a substantially circular shape in advance.

As illustrated in FIG. 1 to FIG. 7, forward/backward movement device 1 includes forward/backward member 11, and latching section 12 which is provided at a leading end of forward/backward member 11, and forward/backward member 11 moves forward and backward and thus opens and closes fuel lid 120.

Fuel lid 120 is provided with latched section 140 onto which latching section 12 of forward/backward member 11 can be latched. Latched section 140 is, for example, a hole having an opening through which latching section 12 can pass when latching section 12 is in a predetermined angular position.

According to opening/closing apparatus 100 configured in the manner described above, when fuel lid 120 is closed, fuel lid 120 pushes forward/backward member 11, and forward/backward member 11 moves backward toward the inner side of vehicle body 2. When fuel lid 120 is closed and comes into contact with latching section 12, latching section 12 of forward/backward member 11 is in the predetermined angular position (see latching section 12 illustrated with imaginary line in FIG. 2) and therefore passes through the opening of latched section 140 and enters latched section 140. Further, when forward/backward member 11 moves backward, latching section 12 positioned inside latched section 140 rotates and the angle of latching section 12 changes (see latching section 12 illustrated with solid line in FIG. 2), and thus, latching section 12 is latched onto latched section 140. When latching section 12 is latched onto latched section 140, fuel lid 120 in a closed state is locked.

When fuel lid 120 is pushed in the state where filler opening portion 2a is closed by fuel lid 120, an energization force acts on forward/backward member 11, and forward/backward member 11 moves forward to the outer side of vehicle body 2. At this time, when latching section 12 of forward/backward member 11 rotates and the angular position of latching section 12 becomes the predetermined angular position, latching between latching section 12 and latched section 140 is released. Thus, action for fuel lid 120 to open is made.

Although details will be given later, in a locked state where the forward/backward movement of forward/backward movement device 1 is restricted, and when fuel lid 120 is closed, further pushing of fuel lid 120 does not cause any energizing force that causes forward/backward member 11 to move forward to the outer side of vehicle body 2 to act on forward/backward member 11. Thus, fuel lid 120 does not open.

[Overall Configuration of Forward/Backward Movement Device 1]

Figure 8:
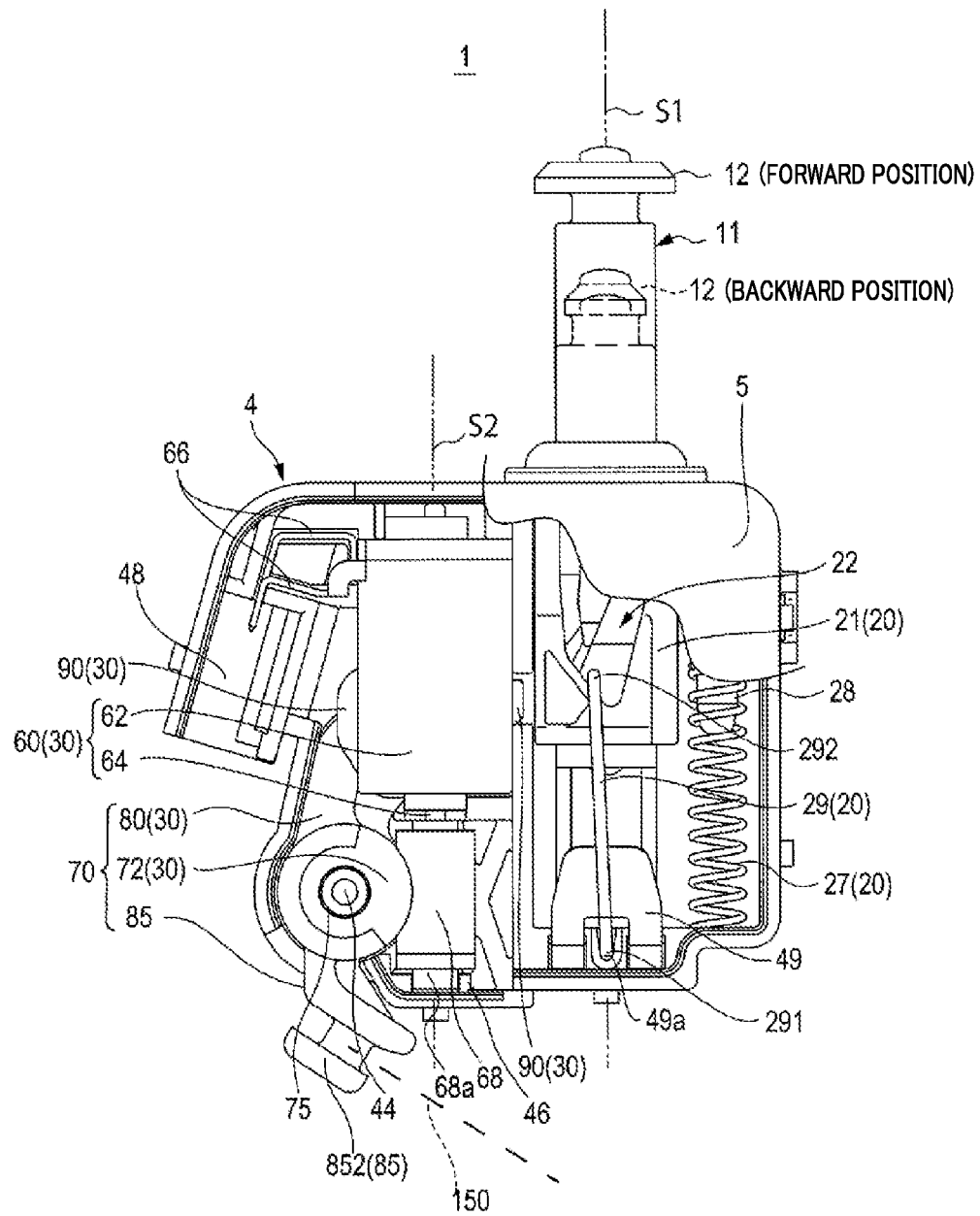
FIG. 8 is a front view of an inner structure of the forward/backward movement device according to the embodiment of the present invention.

As illustrated in FIG. 8, forward/backward movement device 1 includes case 4, forward/backward member 11, and drive mechanism 30. Note that, a state where forward/backward member 11 has moved to a forward position is illustrated in FIG. 8.

Forward/backward movement device 1 locks, by drive mechanism 30, forward/backward member 11 which moves forward and backward with respect to case 4. Forward/backward member 11 of forward/backward movement device 1 is capable of moving forward and backward by forward/backward position control mechanism 20. Further, drive mechanism 30 includes drive section 60, gear section 72, arm section 80, and lock portion 90. Further, forward/backward movement device 1 includes cable 150 in this embodiment.

[Case 4]

Figure 14:
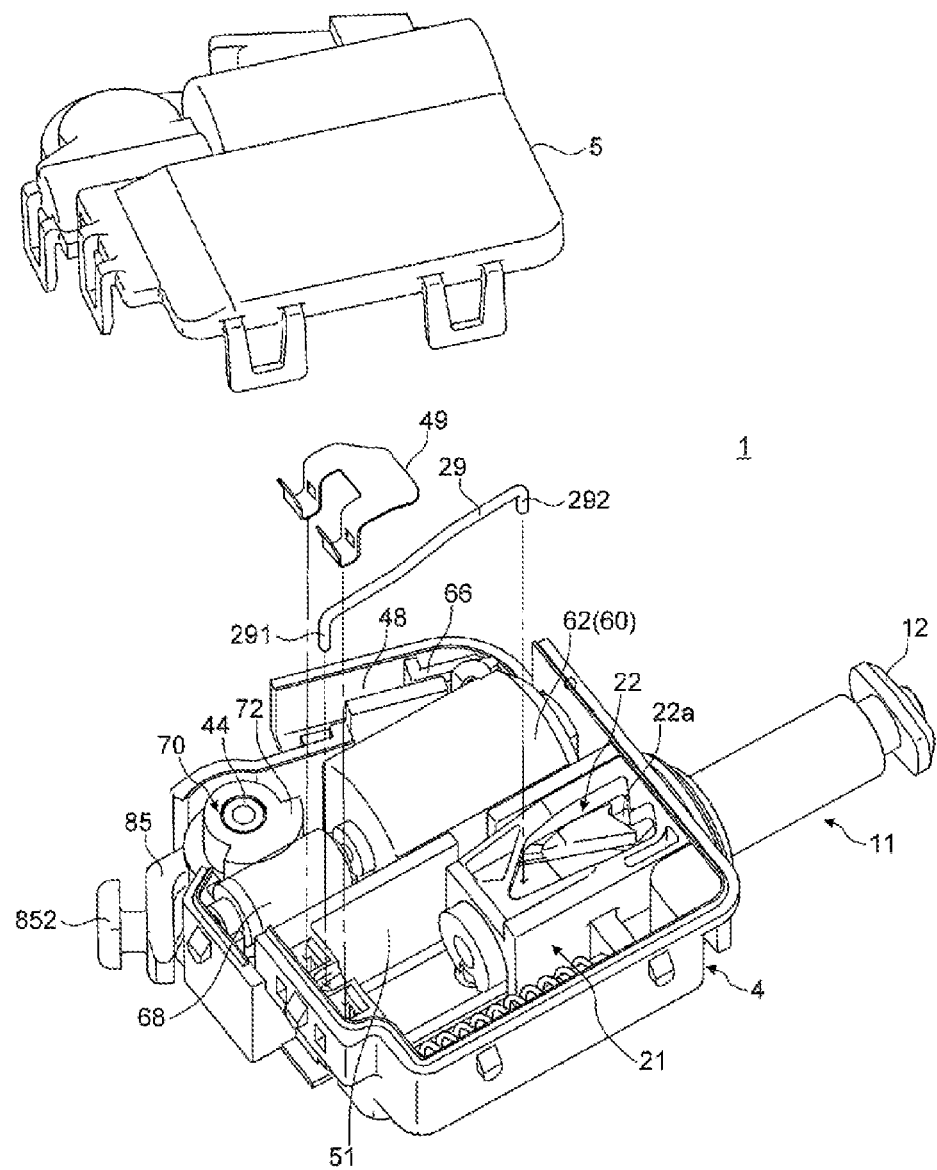
FIG. 14 is an exploded perspective view of the case and a cover in the forward/backward movement device according to the embodiment of the present invention.

As illustrated in FIG. 8, case 4 includes a plurality of holding sections that hold components of forward/backward member 11, forward/backward position control mechanism 20, and drive section 30. Case 4 herein includes an opening to be covered by cover 5. Each component to be assembly attached inside of case 4, such as forward/backward member 11, is housed inside of case 4 through this opening. Cover 5 is placed over the opening after required components are housed and assembly attached inside of case 4 (see FIG. 8 and FIG. 14). Note that, the components of forward/backward position control mechanism 20 include components, such as forward/backward-member-side member 21 and spring 27 and/or the like serving as the energization member. Further, the components of drive mechanism 30 include components, such as drive section 60, gear section 72, arm section 80 and lock portion 90.

Figure 9:
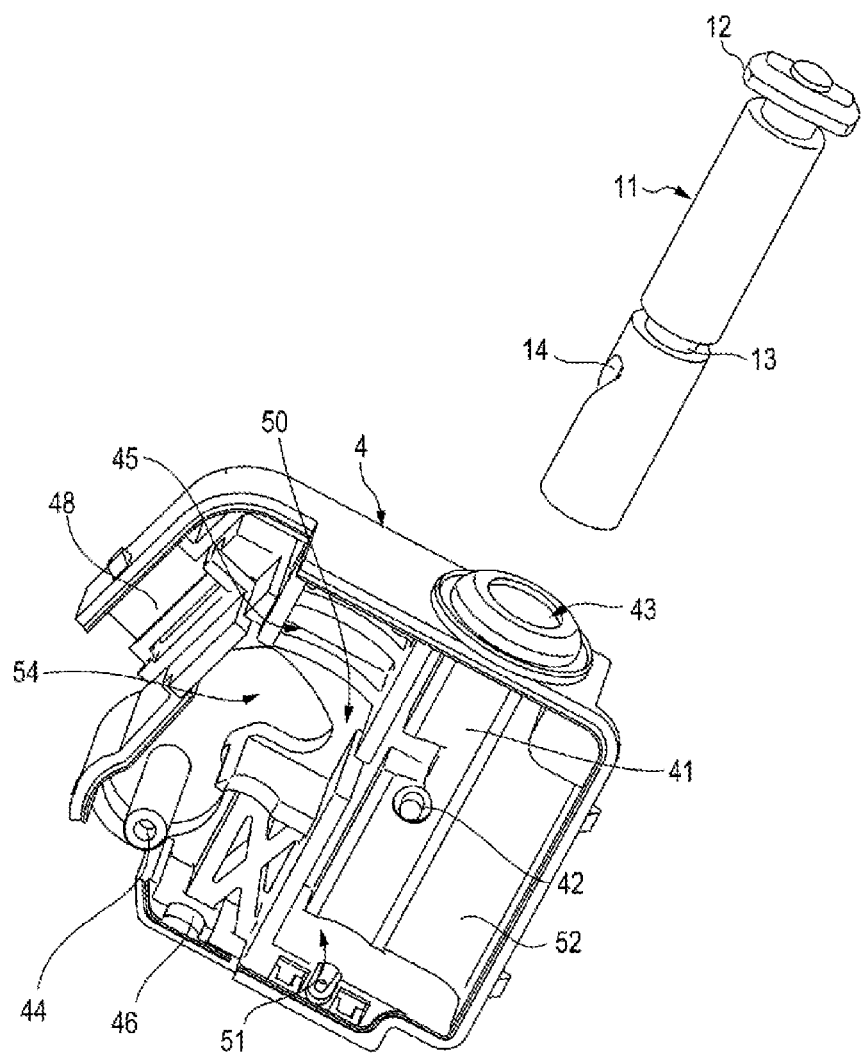
FIG. 9 is a perspective view of a state in which the forward/backward member is separated from a case in the forward/backward movement device according to the embodiment of the present invention.

One surface of case 4 is provided with through hole 43 through which a part of forward/backward member 11 passes so as to allow forward/backward member 11 to move forward and backward with respect to case 4, as illustrated in FIG. 9. In case 4, holding sections (i.e., first holding section 41, drive-section main-body holding section 45, lead-out hole 48, second holding section 51, third holding section 50, spring housing section 52, turn region section 54 to be described later) by which forward/backward member 11 and the components of drive mechanism 30, such as lock portion 90 are held, are formed by a wall shape portion erected between bottom portions, and an uneven portion, with the opening where cover 5 is placed, as an upper portion. Lead-out hole 48 is hole 48 for leading out a wire (illustration is omitted) to be connected to terminal 66.

Case 4 is provided with first holding section 41 which holds forward/backward member 11 movably in a predetermined direction, third holding section 50 which slidably holds lock portion 90, second holding section 51 which slidably holds a part of forward/backward-member-side member 21, and spring housing section 52. In this embodiment, first holding section 41 is disposed along a bottom portion of case 4, and second holding section 51 is disposed on a side of the opening of case 4 with respect to first holding portion 41. First holding section 41 and second holding section 51 form a forward/backward movement space for forward/backward member 11 and forward/backward-member-side member 21 in case 4. Case 4 is provided with turn region section 54 formed in a recess shape from the circumference of spindle 44 to a part of third holding section 50, contiguously, in a position on a side of the bottom surface relative to third holding section 50. Turn region section 54 is an area which defines the turning area of arm section 80.

Case 4 is provided with: spindle 44 which rotatably supports gear section 72; drive-section main-body holding section 45 which holds drive section main body 62 of drive section 60; and bearing 46 which supports shaft portion 68a of worm gear 68 of drive section 60.

Forward/backward member 11 and forward/backward-member-side member 21 provided on a side of forward/backward member 11 are movable with no looseness with respect to case 4 because of first holding section 41 and second holding section 51. Accordingly, movement of forward/backward-member-side member 21 can be regulated in a predetermined position by lock portion 90 held by third holding portion 50.

Further, in this embodiment, spring housing portion 52 and drive-section main-body holding section 45 are disposed in a position where first holding section 41 and second holding section 51 are positioned between spring housing portion 52 and drive-section main-body holding section 45 in a direction (i.e., width direction) orthogonal to a direction in which first holding section 41 and second holding section 51 are aligned (i.e., forward/backward direction of forward/backward member 11).

Spring housing section 52 houses spring 27, therein. Spring 27 is disposed so as to be positioned along the forward/backward direction of forward/backward member 11 and is held by forward/backward-member-side member 21. Drive-section main-body holding section 45 is provided in a direction orthogonal to the forward/backward direction with respect to the spring housing portion, i.e., in the width direction and adjacent to first holding section 41 and second holding section 51.

Lead-out hole 48 is disposed adjacent to drive-section main-body holding section 45 and third holding section 50 on a side opposite to first holding section 41 and second holding section 51 with respect to drive-section main-body holding section 45 and third holding section 50. Lead-out hole 48 has a length extending in a direction containing the forward/backward direction as a component. In this embodiment, lead-out hole 48 is provided so as to extend in forward/backward direction more than width direction, and leads out a wire connected to terminal 66 while guiding the wire in the forward/backward direction.

As described above, in case 4, first holding section 41 and second holding section 51, and third holding section 50 and drive-section main-body holding section 45 are positioned adjacent to each other. Lead-out hole 48 and spring housing section 52 are disposed, respectively, on both sides of first holding section 41 and second holding section 51, and third holding section 50 and drive-section main-body holding section 45, which are positioned adjacent to each other. More specifically, spring housing section 52 is provided on a side of first holding section 41 and second holding section 51, and lead-out hole 48 is provided on a side of third holding section 50 and drive-section main-body holding section 45. In case 4, third holding section 50 and drive-section main-body holding section 45 are adjacent with respect to first holding section 41 in the width direction, and drive-section main-body holding section 45 is adjacent with respect to third holding section 50 in a thickness direction. Case 4 is configured to have a large thickness in a center portion and/or near the center portion in the width direction and has a small thickness on both end sides in the width direction due to the adjacent relationship of first holding section 41, third holding section 50, and drive-section main-body holding section 45.

[Forward/Backward Member 11]

Forward/backward member 11 is a member capable of moving forward and backward with respect to case 4. More specifically, forward/backward member 11 is movable to a forward position where forward/backward member 11 has moved forward and to a backward position where forward/backward member 11 has moved backward. The term "moving forward" refers to a movement toward the outer side of case 4, and the term "moving backward" refers to a movement toward the inner side of case 4. Further, the term "forward position" is a stop position of forward/backward member 11 which has moved forward, and the term "backward position" is a stop position of forward/backward member 11 which has moved backward. Accordingly, when the forward position and the backward position are both outside of case 4 as in this embodiment, for example, a specific portion of forward/backward member 11, e.g., a leading end of forward/backward member 11 is distant from case 4 in the forward position as compared with the backward position.

In opening/closing apparatus 100 (see FIG. 1), the forward position is a position where latching section 12 and latched section 140 of fuel lid 120 are in an unlatched state, and fuel lid 120 is thus in an open state. Further, in opening/closing apparatus 100, the backward position is a position where latching section 12 and latched section 140 of fuel lid 120 are in a latched state, and fuel lid 120 is thus held in a closed state.

Note that, as a variation, it is conceivable that the forward position and the backward position are both inside of case 4. In this case, a specific portion of forward/backward member 11, for example, the leading end of forward/backward member 11 approaches to the outside of case 4 as compared with the backward position. It is further conceivable that the forward position is outside of case 4 and the backward position is inside of case 4. In this case, a specific portion of forward/backward member 11, for example, the leading end of forward/backward member 11 extends out from case 4.

Forward/backward member 11 is provided in case 4 so as to move forward and backward while rotating relatively to case 4.

In the present embodiment, forward/backward member 11 includes a circular columnar or cylindrical rod part, and latching section 12 provided at the leading end of the rod part. In the present embodiment, forward/backward member 11 is disposed such that the axial direction of forward/backward member 11 coincides with the direction in which forward/backward member 11 moves forward and backward (forward direction and backward direction). Annular groove 13 is provided in a portion of the rod part in the axial direction. Annular groove 13 is an example of a fitted section to which forward/backward-member-side member 21 to be described later is fitted in a relatively rotatable manner. Further, helical groove 14 is provided in a portion of the rod part on the backward side relative to annular groove 13. Annular groove 13 is provided along the outer periphery of the rod part so as to be perpendicular to the axis of forward/backward member 11. Annular groove 13, which is the fitted section, is provided such that forward/backward-member-side member 21 is prevented from being displaced and hindering restriction by lock portion 90, when forward/backward member 11 rotates in the direction about the axis thereof.

Forward/backward member 11 is inserted through through-hole 43 of case 4 and is slidably held by first holding section 41 of case 4. First holding section 41 is provided with a wall surface which holds forward/backward member 11, and the wall surface is provided with protrusion 42. Forward/backward member 11 is disposed such that protrusion 42 on the wall surface on a bottom side of case 4 is inserted into helical groove 14. Note that, the bottom side of case 4 corresponds to the side opposite to the side where cover 5 is attached in case 4. Further, the movement of forward/backward member 11 in the direction orthogonal to the axial direction thereof is restricted by forward/backward-member-side member 21 (see FIG. 3), cover 5, and the wall surface of case 4, and thus, coming off of protrusion 42 from helical groove 14 is suppressed. Therefore, when forward/backward member 11 moves in the forward/backward direction, the position of helical groove 14 in the circumferential direction is restrained by protrusion 42, and thus, forward/backward member 11 rotates about the axial core. That is, forward/backward member 11 moves forward and backward while rotating about the axial core, as an example of moving forward and backward while rotating relatively with respect to case 4.

Protrusion 42 of first holding section 41 and helical groove 14 of forward/backward member 11 form a mechanism that causes forward/backward member 11 to move forward and backward while rotating relatively with respect to case 4. Helical groove 14 of forward/backward member 11 is an example of a trajectory guiding section that guides forward/backward member 11 along the trajectory of the rotational movement of forward/backward member 11, and protrusion 42 of first holding section 41 is an example of a trajectory guided section to be guided by the trajectory guiding section. As a variation, first holding section 41 may be provided with a trajectory guiding section, such as a helical groove, and forward/backward member 11 may be provided with a trajectory guided section, such as a protrusion. That is, it is possible to employ a configuration in which one of case 4 and forward/backward member 11 includes a trajectory guiding section that guides the movement trajectory of forward/backward member 11 such that forward/backward member 11 moves forward and backward while rotating relatively with respect to case 4, and the other one of case 4 and forward/backward member 11 includes a trajectory guided section to be guided by the trajectory guiding section.

Note that, in the present embodiment, as an example of the behavior of forward/backward member 11, which moves forward and backward while rotating relatively with respect to case 4, continuous rotation associated with forward/backward movement of forward/backward member 11 has been mentioned, but another behavior is also conceivable. For example, the behavior of forward/backward member 11 may be temporary rotation or intermittent rotation of forward/backward member 11 in the process of the forward/backward movement of forward/backward member 11 or at the time of start or end of the forward/backward movement.

[Forward/Backward Position Control Mechanism 20]

Forward/backward position control mechanism 20 is a mechanism that performs control such that forward/backward member 11 moves forward to the forward position where forward/backward member 11 has moved forward with respect to case 4 and moves backward to the backward position where forward/backward member 11 has moved backward with respect to case 4. Forward/backward position control mechanism 20 includes a case-side member provided in a predetermined position relative to case 4 and forward/backward-member-side member 21 provided on forward/backward member 11 so as to be fitted relatively rotatable with respect to forward/backward member 11. Forward/backward position control mechanism 20 also includes spring 27 and pin 29.

Forward/backward position control mechanism 20 has a movement function of moving forward/backward member 11 in the forward/backward direction and a stop function of stopping forward/backward member 11 in the forward position or the backward position. Since the movement in the forward/backward direction, the forward position and the backward position of forward/backward member 11 are all determined by the relative positional relationship with case 4, forward/backward position control mechanism 20 includes a portion provided on case 4 (that is, case-side member) and a portion provided on forward/backward member 11 (that is, forward/backward-member-side member 21) each configured to be capable of controlling the positional relationship of these components. These members are both disposed inside of case 4. In the present embodiment, pin 29 is used as an example of the case-side member.

[Forward/Backward-Member-Side Member 21]

Forward/backward-member-side member 21 illustrated in FIG. 8 and FIG. 10 to FIG. 13 is provided on forward/backward member 11 so as to be fitted relatively rotatable with respect to forward/backward member 11. Forward/backward-member-side member 21 moves along with forward/backward member 11 in the axial direction of forward/backward member 11. In this embodiment, although forward/backward-member-side member 21 is a member different from forward/backward member 11, forward/backward-member-side member 21 is provided on forward/backward member 11 and functions as a part of forward/backward member 11. Further, in this embodiment, forward/backward-member-side member 21 includes recess portion 24 as an engaged portion to be engaged with lock portion 90, and spring shaft 28 which holds one end portion of spring 27.

Figure 10:
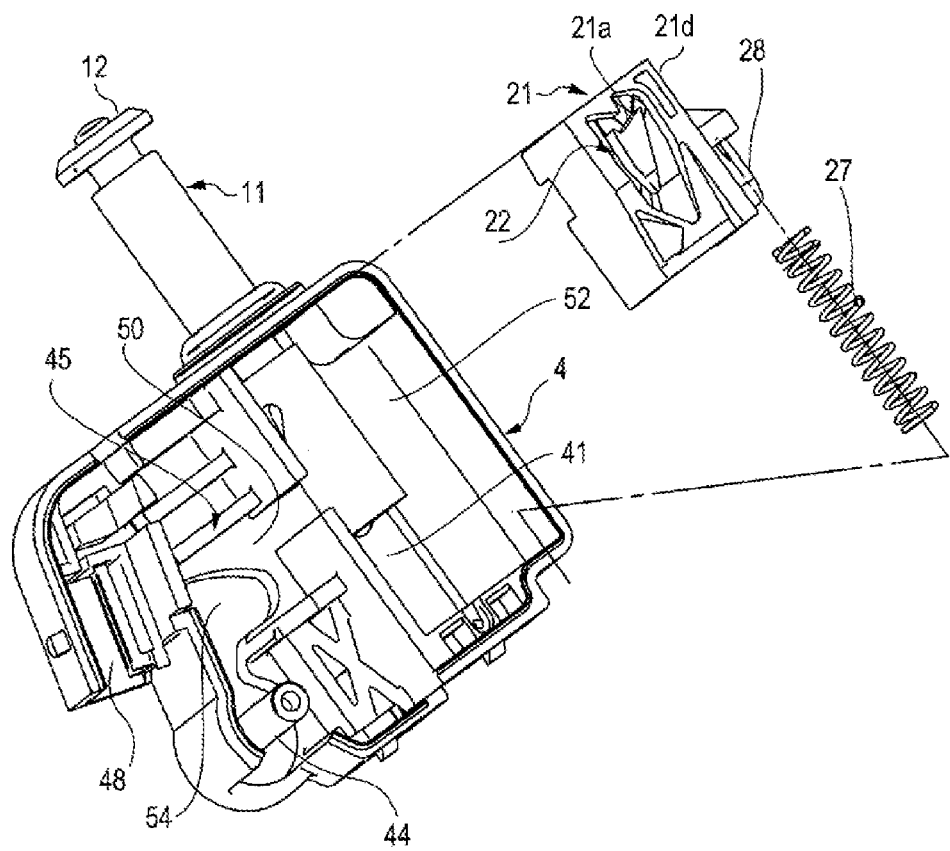
FIG. 10 is a perspective view of a state in which a forward/backward-member-side member is separated from a main-body side in the forward/backward movement device according to the embodiment of the present invention.

In this embodiment, forward/backward-member-side member 21 is fitted so as to be relatively rotatable with respect to forward/backward member 11. Forward/backward-member-side member 21 includes first plate-shaped section 21a which extends horizontally along the axis of forward/backward member 11 and includes guiding section 22, and second plate-shaped section 21b which extends from first plate-shaped section 21a in a direction perpendicular to the axis of forward/backward member 11, as illustrated in FIG. 10 and FIG. 11.

Figure 11:
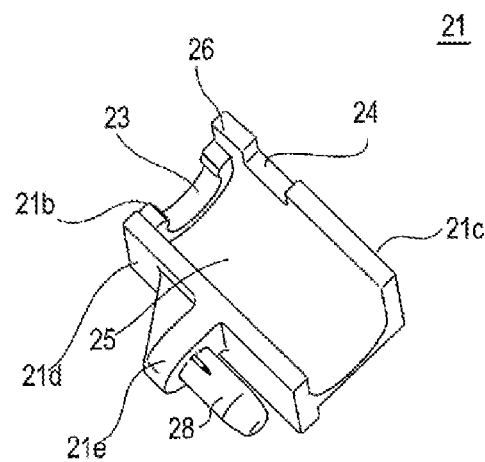
FIG. 11 is a rear-side perspective view of the forward/backward-member-side member.

Second plate-shaped section 21b includes fitting section 23 having a letter C-shape, and fitting section 23 is fitted to annular groove 13 of forward/backward member 11, as illustrated in FIG. 11. Second plate-shaped section 21b therefore slides along annular groove 13 in the direction about the axis of forward/backward member 11, but the relative movement of forward/backward member 11 in the axial direction and second plate-shaped section 21b in a direction perpendicular to the axial direction, and forward/backward member 11 is regulated. Therefore, forward/backward member 11 and forward/backward-member-side member 21 become relatively rotatable in the rotation direction about the axis core of forward/backward member 11 while relative movement of forward/backward member 11 and forward/backward-member-side member 21 in the axial direction of forward/backward member 11 is made impossible.

Further, third plate-shaped section 21c is provided in forward/backward-member-side member 21 so as to intersect first plate-shaped section 21a and second plate-shaped section 21b at right angles, and fourth plate-shaped section 21d is provided in forward/backward-member-side member 21 so as to intersect first plate-shaped section 21a and second plate-shaped section 21b at right angles and to face third plate-shaped section 21c.

When fitting section 23 is fitted to annular groove 13, forward/backward-member-side member 21 is attached onto forward/backward member 11 such that first plate-shaped section 21a, third plate-shaped section 21c, and fourth plate-shaped section 21d surround forward/backward member 11 in the circumferential direction. Further, forward/backward-member-side member 21 is provided with curved surface 25 having a shape that follows the outer surface of the rod part of forward/backward member 11. Forward/backward-member-side member 21 and forward/backward member 11 relatively rotate in a state where curved surface 25 follows the outer surface of the rod part of forward/backward member 11. As a result, looseness-free rotation is obtained. Fitting section 23 is disposed on the forward side of forward/backward-member-side member 21 in the forward/backward direction of forward/backward member 11. In other words, the position of second plate-shaped section 21b having fitting section 23 in the forward/backward-member-side member 21 may be any position as long as the position allows second plate-shaped section 21b to come into contact with the inner wall surface around through hole 43 in case 4 when forward/backward-member-side member 21 moves in accordance with the forward movement of forward/backward member 11.

Fourth plate-shaped section 21d is provided with spring shaft 28 formed on a side of the backward direction of forward/backward-member-side member 21 as an example of spring holding section. Spring shaft 28 is provided in overhanging piece 21e which overhangs from fourth plate-shaped section 21d, so as to become a shaft parallel to a center axis of forward/backward member 11. One end of spring 27, which is a coil spring, is placed over spring shaft 28. Thus, forward/backward movement of forward/backward-member-side member 21 together with forward/backward member 11 causes spring 27 to be stretched or compressed.

Note that, the fitting structure of forward/backward member 11 and forward/backward-member-side member 21 may be any structure as long as these members are relatively rotatable about the axial core of forward/backward member 11. For example, forward/backward member 11 may be provided with an annular protrusion, and forward/backward-member-side member 21 may be provided with an annular groove to which the annular protrusion is fitted. The annular protrusion may be replaced with a plurality of protrusions. Forward/backward-member-side member 21 and forward/backward member 11 are not particularly limited to specific shapes as long as forward/backward member 11 is fitted to forward/backward-member-side member 21 such that forward/backward-member-side member 21 is movable together with forward/backward movement of forward/backward member 11 in the axial direction and forward/backward member 11 is relatively rotatable with respect to forward/backward-member-side member 21 while movement of forward/backward member 11 is regulated in a case where movement of forward/backward-member-side member 21 is regulated. The fitting section of forward/backward-member-side member 21 and the fitted section of forward/backward member 11 are readily attachable to one another when one of the fitting section and the fitted section has an annular shape.

Third plate-shaped section 21c of forward/backward-member-side member 21 includes overhanging portion 26 which is formed such that third plate-shaped section 21c partly overhangs. Forward/backward-member-side member 21 is held in case 4 in a state where overhanging portion 26 is slidable against second holding section 51 of case 4. Second holding section 51 extends linearly and parallel to the forward/backward direction of forward/backward member 11, and when forward/backward member 11 moves in the forward/backward direction, overhanging portion 26 moves along second holding section 51. Second holding section 51 is formed so as to be laterally surrounded by wall bodies, and thus, is capable of suppressing rotation of forward/backward-member-side member 21. Overhanging portion 26 is provided at the leading end of third plate-shaped section 21c in an extension direction from first plate-shaped section 21a. However, as long as the posture of forward/backward-member-side member 21 becomes stable in the forward/backward movement of forward/backward member 11, the position of overhanging portion 26 or the contact position with case 4 is not limited, particularly. Further, fourth plate-shaped section 21d of forward/backward-member-side member 21 may be configured to slide against the inner wall of case 4 and thus to make the posture during movement of forward/backward-member-si de member 21 associated with the forward/backward movement of forward/backward member 11 stable.

Overhanging portion 26 is provided with an engaged section which is engaged with lock portion 90 and restricts the movement of forward/backward-member-side member 21 in the direction along the center axis of forward/backward member 11. An example of this engaged section is recess portion 24 where engaging section 91 (see FIG. 12) of lock portion 90 enters, and recess portion 24 is provided in a part of overhanging portion 26. Note that, recess portion 24 allows the forward/backward length of forward/backward member 11 restricted by engaging section 91 of lock portion 90 to be changed in accordance with the position of a separating surface in the axial direction, which separates recess portion 24 on a side of the backward direction in overhanging portion 26. In the present embodiment, recess portion 24 is provided in a position where engaging section 91 is inserted when forward/backward member 11 is located in the backward position. Recess portion 24, which is the engaged section, is provided on a side opposite to guiding section 22 in forward/backward-member-side member 21 in the thickness direction of case 4.

Further, first plate-shaped section 21a of forward/backward-member-side member 21 includes guiding section 22 in which protrusions and recesses are formed on the surface of the plate-shaped member, as illustrated in FIG. 10. Guiding section 22 guides movement of forward/backward-member-side member 21. This guiding section 22 having a plate shape regulates a relative movement operation of the case-side member and forward/backward-member-side member 21.

Pin 29, which is an example of the case-side member, is provided in a predetermined position with respect to case 4. In more detail, pin 29 is provided so as to have a portion (bent portion 291, herein, which will be described later) whose relative position to case 4 does not change.

Pin 29 includes bent portions 291 and 292 at both ends. Bent portion 291 at one end (base end) is fitted to fitting hole 49a (see FIG. 8 and FIG. 14) of fixing plate 49 attached to an opening edge where cover 5 is attached.

Bent portion 292 at the other end (leading end) is an example of a guided section to be guided by guiding section 22 of forward/backward-member-side member 21. Pin 29 may have elasticity as long as it has rigidity capable of controlling the forward/backward movement of forward/backward member 11. Pin 29 is disposed such that one end is fitted to fitting hole 49a, and thus one end side is pressed against guiding section 22. With this configuration, a state is set in which bent portion 292 at the leading end of pin 29 is pressed against guiding section 22 of forward/backward-member-side member 21, and thus, pin 29 is fixed turnably about fitting hole 49a of case 4.

Guiding section 22 of forward/backward-member-side member 21 is a so-called heart cam and includes a circumferentially extending recess portion on a plate-shaped surface, and guides bent portion 292 of pin 29 along the circumferentially extending recess portion. A step is provided at the bottom of the circumferentially extending recess portion, and bent portion 292 of pin 29 is guided in a descending direction along the step. Thus, bent portion 292 of pin 29 is guided so as to go around in one direction along the circumferentially extending recess portion of guiding section 22. When bent portion 292 of pin 29 is in a backward side position in the circumferentially extending recess portion of guiding section 22, forward/backward member 11 is in the forward position where forward/backward member 11 has moved forward to the outer side of case 4. When bent portion 292 of pin 29 is in a forward-side position in the circumferentially extending recess portion of guiding section 22, that is, when bent portion 292 is engaged with v-shaped portion 22a, which is a valley portion at the center of a letter "M" shape, forward/backward member 11 is located in the backward position where forward/backward member 11 has moved backward to the inner side of case 4. The position of bent portion 292 of pin 29 that is the backward-side position in the circumferentially extending recess portion of guiding section 22 corresponds to an example of a first position. Further, the position of bent portion 292 of pin 29 that is the forward-side position in the circumferentially extending recess portion of guiding section 22 corresponds to an example of a second position. As described above, the guided section is guided to the first position and the second position of guiding section 22, and thus forward/backward member 11 is moved to the forward position and the backward position.

The circumferentially extending recess portion of guiding section 22 has a path portion curved in a letter "M" shape on the forward side in the forward/backward direction of forward/backward member 11. When forward/backward member 11 is moved backward almost to the end once by bent portion 292 of pin 29 being guided in this path portion, forward/backward member 11 slightly moves forward and temporarily stops there. Bent portion 292 of pin 29 at this time is in a state of being positioned in v-shaped portion 22a, which is the valley portion of the letter "M" shape. When forward/backward member 11 is moved backward almost to the end one more time, bent portion 292 of pin 29 comes off from v-shaped portion 22a and moves, and forward/backward member 11 moves forward to the forward position with this movement.

[Spring 27]

Figure 12:
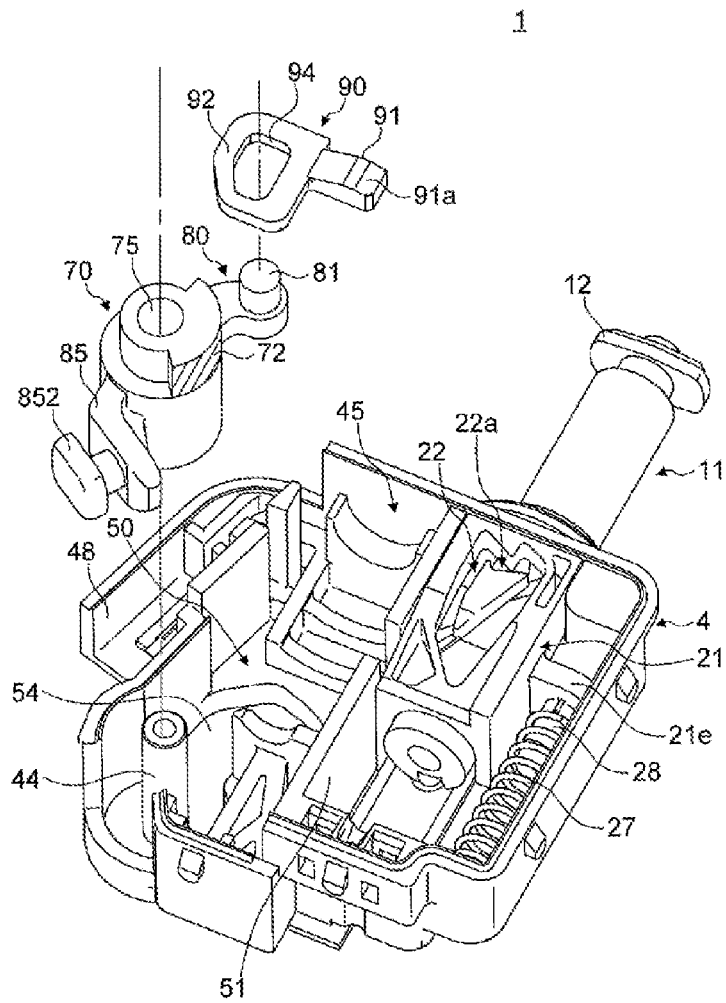
FIG. 12 is a perspective view of an attachment position for a lock portion to the case in the forward/backward movement device according to the embodiment of the present invention.

Spring 27 energizes forward/backward member 11 in the axial direction of forward/backward member 11, in particular, in the forward direction of forward/backward member 11. Spring 27 has one end placed over spring shaft 28 of forward/backward-member-side member 21, and the other end of spring 27 is held by case-side spring holding section (not illustrated) of case 4, as illustrated in FIG. 8, FIG. 10, and FIG. 12. Thus, spring 27 exerts a repulsive force in the forward direction of forward/backward member 11 with respect to forward/backward member 11 and forward/backward-member-side member 21 which moves together with forward/backward member 11. The forward movement of forward/backward member 11 energized in the forward direction by spring 27 is regulated when forward/backward-member-side member 21, which is fitted in a relatively rotatable manner in case 4, comes into contact with an inner wall surface around through hole 43 in the present embodiment.

As described above, guiding section 22, and bent portion 292, which is an example of a guided section, serve a role of regulating the relative movement operation between forward/backward-member-side member 21, and pin 29, which is an example of the case-side member, in forward/backward position control mechanism 20, which controls forward/backward movement of forward/backward member 11.

Note that, the motion of forward/backward member 11 in the backward direction is caused by an external force, and the motion of forward/backward member 11 in the forward direction is caused by the energizing force of spring 27. Note that, the configuration of forward/backward position control mechanism 20, which controls the forward/backward movement of forward/backward member 11, is not limited to the configuration described above unless the relative position between the position of forward/backward-member-side member 21 and spring 27 with respect to forward/backward member 11 is changed from the position in the present embodiment. For example, guiding section 22 may be fixed to case 4, and forward/backward member 11 may be provided with a guided section to be guided by guiding section 22. In the case where guiding section 22 is fixed to case 4, pin 29 to be guided by guiding section 22 is provided on a side of forward/backward member 11. Further, any one of the case-side member and the forward/backward-member-side member may include a guided section, while the other may include a guiding section.

[Configuration of Drive Mechanism 30]

Drive mechanism 30 rotates gear section 72 by driving of drive section 60 and thereby rotates arm section 80, and by rotation of arm section 80, engaging section 91 of lock portion 90 is engaged with forward/backward member 11 (forward/backward-member-side member 21 provided in forward/backward member 11 in this embodiment), and thus locks forward/backward member 11.

[Drive Section 60]

Drive section 60 generates a driving force that moves lock portion 90. Drive section 60 includes drive section main body 62 which generates the driving force, and drive shaft 64 which rotates by the driving force of drive section main body 62. In the present embodiment, a motor is applied as drive section 60. In the present embodiment, terminal 66 which supplies a power source is connected to drive section 60.

Drive section main body 62 is a motor main body which drives by the power supplied via terminal 66, and drive shaft 64 is an output shaft of the motor. Drive section 60, for example, may cause lock portion 90 to perform a lock operation by solely driving, but in case of application to a vehicle, for example, the lock operation is performed in conjunction with locking by a key operation of the vehicle.

Terminal 66 is provided on a side opposite to forward/backward member 11 with respect to drive section 60.

In the present embodiment, in case 4, terminal 66 is provided in a position communicating with lead-out hole 48 on a side opposite to first holding section 41 with respect to drive-section main-body holding section 45.

In the present embodiment, terminal 66 has an L-shaped cross section. Terminal 66 is disposed such that a bent portion is disposed on a side opposite to forward/backward member 11 with respect to drive section 60, and one end is connected to a side opposite to a shoulder side of drive section 60 where drive shaft 64 protrudes in drive section 60, while the other end is disposed so as to face an opening direction of lead-out hole 48.

Drive shaft 64 which protrudes from drive section main body 62 is disposed substantially parallel to a direction (equivalent to forward/backward direction) in which forward/backward member 11 extends. In this embodiment, drive section 60 is housed in case 4 such that drive section 60 is adjacent to forward/backward member 11 while the respective axes (indicated by S1 and S2 in FIG. 8) of drive section 60 and forward/backward member 11 are substantially parallel to each other in case 4, by being held by drive-section main-body holding section 45.

In this embodiment, drive section 60 is disposed such that drive shaft 64, which is the output shaft of the motor, is directed to the side of the backward position of forward/backward member 11 while drive section main body 62 is directed to the side of the forward position of forward/backward member 11

Drive section 60 is disposed above a movable space (equivalent to turn region section 54) of arm section 80 with respect to arm section 80. The expression "disposed above a movable space of arm section 80 with respect to arm section 80" means that an imaginary plane where arm section 80 is mounted in case 4 is assumed, and drive section 60 is disposed on a plane overlapping with this imaginary plane substantially in parallel to each other. In this embodiment, drive section 60 is disposed above a movable region of arm section 80 and lock main body 92 of lock portion 90. Drive section 60 being provided above the movable space of arm section 80 causes drive section 60 and a part of the movable region of arm section 80 to overlap with each other in the thickness direction of case 4, and thus the width direction of case 4 can be narrowed.

Drive section 60 is disposed adjacent to forward/backward member 11 and above a bottom surface of a bottom portion of case 4 where arm section 80 and lock portion 90 are disposed via each holding portion in case 4.

Figure 15A:
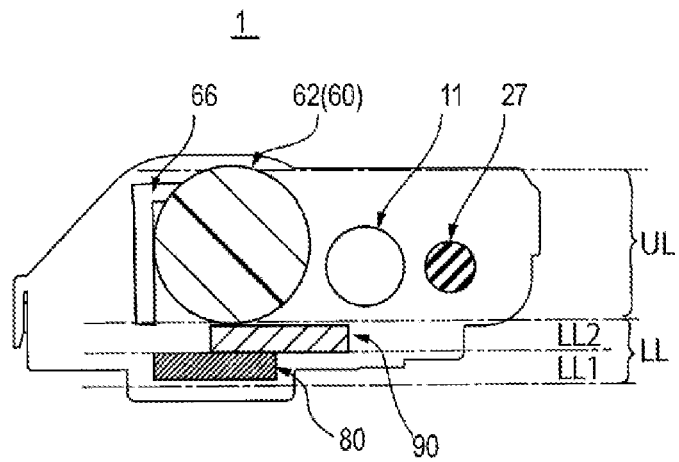
FIG. 15 is a diagram schematically illustrating the arrangement relationship of sections in the forward/backward movement device according to the embodiment of the present invention, including FIG. 15A, which is a bottom view of the forward/backward movement device, schematically illustrating the arrangement relationship of the sections, and FIG. 15B, which is a side view of this forward/backward movement device.
Figure 15B:
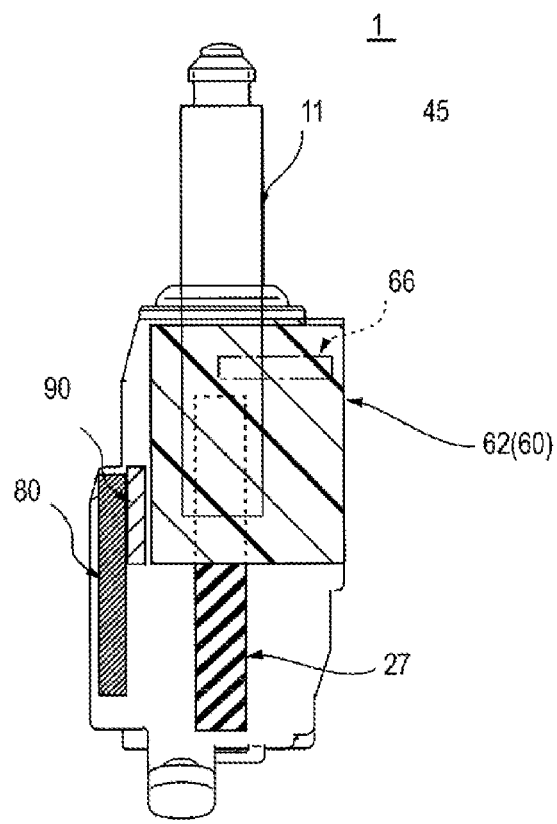

In other words, as illustrated in FIG. 15, an imaginary layer (upper layer portion UL) containing drive section 60 and forward/backward member 11 is disposed on an imaginary layer (lower layer portion LL) containing arm section 80 and lock portion 90 so as to overlap with each other. In this embodiment, lower layer portion LL includes an imaginary layer (first lower layer portion LL1) containing arm section 80, and an imaginary layer (second lower layer portion LL2) containing the lock portion. Accordingly, in forward/backward movement device 1, drive section 60 and forward/backward member 11 are disposed on two layers which are the imaginary layer (first lower layer portion LL1) containing arm section 80 and the imaginary layer (second lower layer portion LL2) containing lock portion 90.

Drive section 60 includes a drive-section shoulder space having a notched space on an axial direction side of a surface on a side of drive section main body 62 where drive shaft 64 protrudes, and around drive shaft 64. The drive-section shoulder space is a recessed space formed in the leading end direction of the drive shaft relative to an outer edge of drive section main body 62 with respect to a rectangle containing drive section main body 62 and drive shaft 64 as viewed from front.

Worm gear 68 is fixed to drive shaft 64 so as to rotate by driving of drive section 60. Shaft portion 68a of worm gear 68 is supported by bearing 46 of case 4. Rotating worm gear 68 is brought in mesh with gear section 72 to cause gear section 72 to rotate by following rotation of worm gear 68. Note that, in each drawing where gear section 72 is illustrated, illustration of teeth provided on the outer periphery of gear section 72 is omitted.

[Gear Section 72 and Arm Section 80]

Gear section 72 and arm section 80 are included in a driving force transmission mechanism which transmits a driving force of drive section 60 to lock portion 90. Gear section 72 and arm section 80 are connected to worm gear 68 of drive shaft 64 and transmit the driving force of drive section 60, i.e., a rotation force of drive shaft 64 to lock portion 90 and thereby moves lock portion 90.

Gear section 72 rotates by rotation of drive shaft 64, in a substantially perpendicular direction with respect to drive shaft 64 as a rotation axis. Arm section 80 rotates by rotation of gear section 72, in a substantially perpendicular direction with respect to drive shaft 64 as a rotation axis.

In this embodiment, gear section 72 is integrally provided with arm section 80 as transmission member 70. This transmission member 70 includes operation lever 85 for emergency in addition to gear section 72 and arm section 80.

Transmission member 70 is provided in a freely rotatable manner about spindle 44. Spindle 44 is a rotation shaft in a substantially perpendicular direction with respect to drive shaft 64. In this embodiment, spindle 44 is disposed on a side opposite to forward/backward-member-side member 21 with respect to drive shaft 64. In transmission member 70, gear section 72 and arm section 80 rotate about spindle 44.

In transmission member 70, one end side of a cylindrical transmission member main body in an axial direction is set to be gear section 72, and operation lever 85 and arm section 80 are provided on another end side of the cylindrical transmission member main body in the axial direction relative to gear section 72. The cylindrical transmission member main body includes, as a center, through hole 75 which is rotatably placed over spindle 44. In this embodiment, gear section 72 is provided on one end side of the axial direction of spindle 44 in transmission member 70, and arm section 80 is provided on the other end side, and operation lever 85 is provided between gear section 72 and arm section 80.

Gear section 72 is a helical gear in this embodiment and is brought in mesh with worm gear 68, and rotates about spindle 44 orthogonal to the drive shaft which is the shaft of worm gear 68.

Gear section 72 is disposed in a plane containing worm gear 68 and drive shaft 64 and is brought in mesh with worm gear 68.

Arm section 80 is provided so as to protrude from a portion overlapping with gear section 72 on the side of the bottom surface of case 4 in the direction of spindle 44 in transmission member 70.

Arm section 80 is provided so as to extend along drive shaft 64 from a side of drive shaft 64 toward a side of drive section main body 62.

In this embodiment, arm section 80 includes a plate shaped arm main body, and engagement protruding portion 81 to be engaged with lock portion 90 is provided in a leading end of this arm main body so as to protrude on the side of drive section main body 62.

Arm section 80 is disposed in a plane which is parallel to the plane containing worm gear 68 and drive shaft 64 and which is positioned on the side of the bottom surface of case 4 relative to drive section main body 62.

Arm section 80 is disposed so as to be freely turnable about spindle 44 in turn region section 54. Thus, arm section 80 swings along a rear surface of drive section main body 62 in a region extending from spindle 44 to a part of drive section main body 62 on the rear surface side supported by third holding section 50.

Operation lever 85 for emergency rotates arm section 80 by being operated, regardless of driving of drive section 60.

In this embodiment, operation lever 85 is provided so as to protrude in a direction opposite to an extending direction of arm section 80, and connection section 852 to which a linear member, such as a cable and/or a rod is connected, is provided in a leading end portion or in the vicinity of operation lever 85, in transmission member 70. Connection section 852 is, for example, a protruding portion, and one end of the linear member is fixed to connection section 852. By rotating transmission member 70 via the linear member, arm section 80 rotates in the same direction as that of transmission member 70.

In this embodiment, a cable connected to an operation section, such as an operation lever which is manually operable, is connected to connection section 852 of operation lever 85.

With this configuration, operation lever 85 enables movement of lock portion 90 via the cable from outside of forward/backward movement device 1 without driving of drive section 60, via the cable. In a state where one end of the cable is connected to connection section 852 of operation lever 85, for example, an operation to pull the other end of the cable moves lock portion 90 to a release position from a lock position and then releases the engagement state with recess portion 24.

As the cable, for example, a control cable is applied. The control cable is generally formed of an inner cable and an outer cable which slidably houses the inner cable, but may be formed of only an inner cable without any outer cable.

In this embodiment, gear section 72 included in transmission member 70 is disposed such that a part of gear section 72 is positioned in the drive-section shoulder space formed by drive section main body 62 and drive shaft 64, a so-called recess portion. Thus, the length in a direction where forward/backward member 11 and drive section 60 are aligned in forward/backward movement device 1 can be short as compared with arrangement in which gear section 72 is disposed outside of a rectangle containing drive section main body 62 and drive shaft 64, i.e., outside of the recess portion. In this embodiment, gear section 72 and arm section 80 may be provided in an optional way as long as a part of gear section 72 is positioned in the drive-section shoulder space, and the function of transmitting the driving force of drive section 60 to lock portion 90 can be fulfilled.

Further, in this embodiment, transmission of the driving force from drive shaft 64 of drive section 60 to lock portion 90 is made to lock portion 90 via worm gear 68 attached to drive shaft 64, and transmission member 70 including gear section 72 and arm section 80. For this reason, when drive section 60 is not driving, drive section 60 is restrained from rotating by transmission member 70 via drive shaft 64. Thus, rotation about the shaft of drive shaft 64 can be regulated without a need to provide a lock mechanism which restricts rotation of drive shaft 64 to drive section 60 itself.

[Lock Portion 90]

Figure 13:
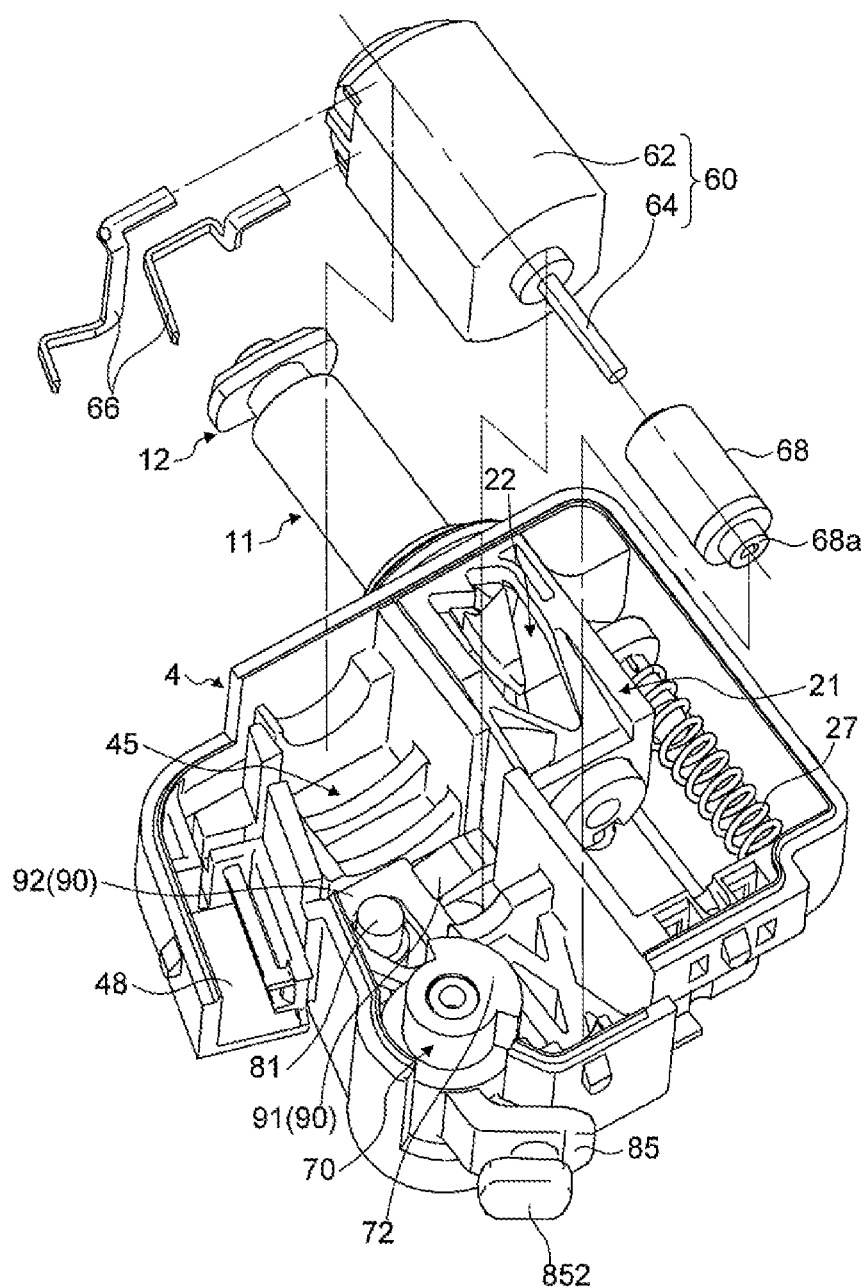
FIG. 13 is a perspective view of a state in which a motor and a worm gear are separated from the main-body side in the forward/backward movement device according to the embodiment of the present invention.

Lock portion 90 illustrated in FIG. 8, FIG. 12 and FIG. 13 sets forward/backward member 11 movable in the axial direction to be in a locked state where movement of forward/backward member 11 in the forward/backward direction (axial direction, herein) is restricted. The locked state is a state where forward/backward member 11 is held in a state where forward/backward member 11 is located in the backward position, and restricted from moving forward and backward. Lock portion 90 is provided so as to be movable to the lock position which sets forward/backward member 11 to be in the locked state and to the release position which releases the locked state.

In this embodiment, lock portion 90 sets forward/backward member 11 to be in the locked state by causing forward/backward member 11 to be engaged with forward/backward-member-side member 21 in the lock position. In this embodiment, the lock position is the same position as the backward position where forward/backward member 11 is held by forward/backward position control mechanism 20, as an example. Therefore, when forward/backward member 11 is located in the backward position by forward/backward position control mechanism 20, lock portion 90 sets forward/backward member 11 to be in the locked state, and restricts movement to the forward position by forward/backward position control mechanism 20. Note that, the lock position may not be the backward position where forward/backward member 11 is held by forward/backward position control mechanism 20, and a configuration may be employed, which restricts, in the middle of movement of forward/backward member 11 from the backward position to the forward position, movement of forward/backward member 11 until the latched state between latching section 12 and latched section 140 is released. Note that, the locked state in which the forward/backward movement is restricted is representatively a state in which the movement in the forward direction and the movement in the backward direction are both restricted, as will be described later, but as a variation, the locked state may be a state in which only one of the movement in the forward direction and the movement in the backward direction is restricted.

Lock portion 90 includes: a conversion mechanism section which converts rotation of arm section 80 into a linear motion; and engaging section 91 to be engaged with forward/backward member 11. In lock portion 90, rotation of arm section 80 is converted into linear motion by the conversion mechanism section and thereby engaging section 91 makes linear motion.

In the present embodiment, as illustrated in FIG. 12 and FIG. 13, lock portion 90 is formed in a flat plate shape and includes lock main body 92 connected to arm section 80. Engaging section 91 is provided so as to extend out from lock main body 92 in a direction intersecting the forward/backward direction of forward/backward member 11 and is capable of being engaged with forward/backward member 11, i.e., recess portion 24 of forward/backward-member-side member 21. Conversion mechanism section 94 is a hole portion provided in lock portion main body 92.

Lock portion 90 is slidably held by third holding section 50 of case 4. Third holding section 50 includes a region where lock main body 92 is slidable on turn region section 54, and a region which extends linearly in the same direction as the direction in which engaging section 91 extends out. In each of the regions, lock portion 90 is slidably disposed. In particular, engaging section 91 slidingly moves in the same direction in the region which extends linearly in the same direction as the direction in which engaging section 91 extends out.

Engagement protruding portion 81 of arm section 80 is movably inserted into the hole portion serving as conversion mechanism section 94 of lock main body 92. The hole portion follows the rotation motion of arm section 80 via engagement protruding portion 81 and thereby causes lock portion 90 to make motion in the extending direction of engaging section 91.

More specifically, the hole portion has an edge shape to be pressed in the linear direction, which is the extending direction of engaging section 91, by swaying of engagement protruding portion 81 which sways along with rotation of arm section 80. The pressing force of engagement protruding portion 81 against lock main body 92 is transmitted to lock main body 92 by the hole portion being pressed in the linear direction, and engaging section 91 follows the movement of lock main body 92 and makes linear motion.

When forward/backward member 11 is in the backward position and lock portion 90 moves by an amount equal to or greater than a predetermined amount, engaging section 91 of lock portion 90 enters recess portion 24 of forward/backward-member-side member 21 and is engaged with recess portion 24 which is the engaged portion, and sets forward/backward member 11 to be in the locked state where forward/backward movement of forward/backward member 11 is restricted. The leading end of engaging section 91 includes leading end portion 91a having a tapered shape for facilitating insertion to recess portion 24.

The position of lock portion 90 in FIG. 8 is the release position where the locked state of forward/backward member 11 is released. When lock portion 90 is in the release position, forward/backward member 11 becomes movable forward and backward, and FIG. 8 illustrates a state where forward/backward member 11 has fully moved in the forward direction.

Note that, the configuration for setting forward/backward member 11 to be in the locked state is not limited to the configuration in which engaging section 91 of lock portion 90 enters recess portion 24 of forward/backward-member-side member 21, and various engagement structures may be applied. For example, a configuration may be employed in which a protruding portion is provided in forward/backward member 11 while a recess portion is provided in lock portion 90, and forward/backward member 11 is set to be in the locked state by engagement between the recess portion and the protruding portion when lock portion 90 is located in the lock position.

[Operation of Forward/Backward Movement Device 1]

Figure 16A:
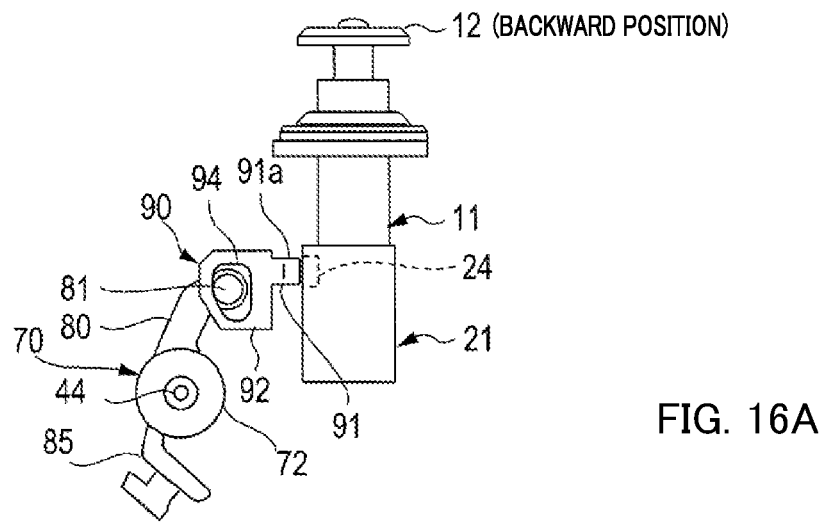
FIGS. 16A-C are diagrams schematically illustrating an operation of the forward/backward movement device according to the embodiment of the present invention.
Figure 16B:
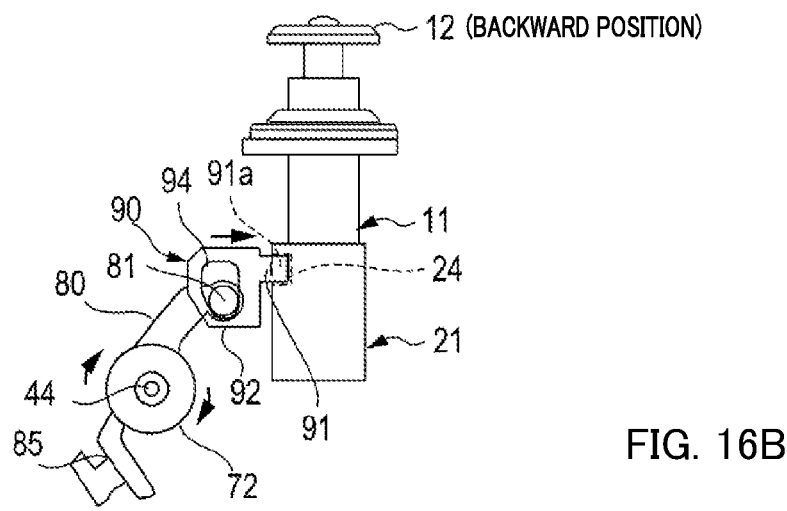
Figure 16C:
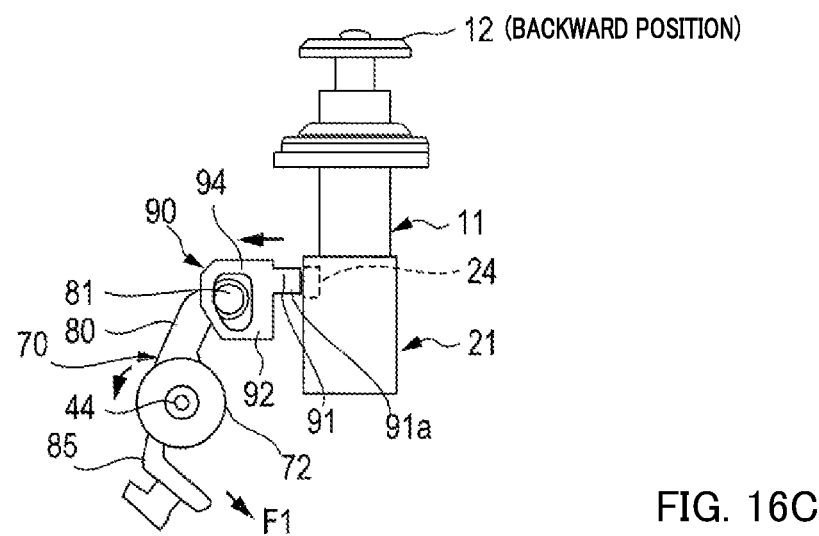

The operation of forward/backward movement device 1 will be described with reference primarily to FIG. 16. Note that, FIG. 16A illustrates a state in which the forward/backward member is located in the backward position and lock portion 90 is located in the release position. FIG. 16B illustrates a state in which lock portion 90 is located in the lock position. FIG. 16C illustrates a state in which lock portion 90 is located in the release position by operation of operation lever 85.

In forward/backward movement device 1 configured as described above, first of all, when forward/backward member 11 is located in the forward position, latching section 12 is directed in the direction in which latching with latched section 140 of fuel lid 120 is to be released, as indicated by the solid-line position of latching section 12 in FIG. 8. Further, lock portion 90 is disposed in the release position via gear section 72 by control of drive section 60. At this point, forward/backward member 11 receives a repulsive force of spring 27 via forward/backward-member-side member 21 and is therefore energized in the forward direction. Further, bent portion 292 of pin 29 is positioned on a backward side on a circumferentially extending path of guiding section 22 and restricts forward/backward member 11 from further moving forward. In this state, when an external force in the backward direction is added to forward/backward member 11, forward/backward member 11 moves backward. During the backward movement, helical groove 14 of forward/backward member 11 is guided by protrusion 42 of case 4 and moves to the backward position such that a trajectory of the movement of forward/backward member 11 in which the leading end of forward/backward member 11 rotates is generated. Thus, forward/backward member 11 rotates in the rotation direction about the axial core thereof.

When forward/backward member 11 is moved to the backward position by the external force, bent portion 292 of pin 29 is positioned on a forward side on the circumferentially extending path of guiding section 22 and temporarily holds forward/backward member 11 such that forward/backward member 11 does not move forward (see FIG. 16A). Specifically, pin 29 is engaged with v-shaped portion 22a of guiding section 22. Further, latching section 12 of forward/backward member 11 is directed in the direction in which latching section 12 is latched onto latched section 140 of fuel lid 120.

In the state where forward/backward member 11 has moved backward, when gear section 72 rotates by control of drive section 60, as illustrated in in FIG. 16B, arm section 80 which is integral with gear section 72 as transmission member 70 turns, and the rotation of arm section 80 is transmitted to lock portion 90 via engagement protruding portion 81 and a hole portion which is conversion mechanism section 94, and then, lock portion 90 moves to the lock position. Along with this movement, engaging section 91 is engaged with recess portion 24 and restricts the slide movement of forward/backward-member-side member 21. The forward/backward movement of forward/backward member 11 is thus restricted.

Further, in the state where forward/backward member 11 has moved backward, when gear section 72 rotates in a reverse direction by control of drive section 60, arm section 80 turns as well, and the rotation of arm section 80 is transmitted to lock portion 90 via engagement protruding portion 81 and the hole portion, which is conversion mechanism section 94. Thus, lock portion 90 moves to the release position, and the restriction of slide movement of forward/backward-member-side member 21 is released, and the restriction of forward/backward movement of forward/backward member 11 is also released.

Releasing of the restriction of the forward/backward movement of forward/backward member 11 can be performed by moving operation lever 85. For example, when a cable is connected to operation lever 85, by pulling this cable in direction F1 illustrated in FIG. 16C, lock portion 90 can be moved to the release position without driving drive section 60, from outside of forward/backward movement device 1.

By the movement of operation lever 85 in direction F1, transmission member 70 turns against the restraining force due to engagement between gear section 72 and worm gear 68 on drive shaft 64, and along with this turning, engagement protruding section 81 of arm section 80 moves in a direction away from engaging section 91. By this movement of engagement protruding section 81, lock main body 92 moves in a direction away from forward/backward-member-side member 21. Engaging section 91 of lock portion 90 separates from recess portion 24 of forward/backward member 11, and the engaged state with recess portion 24 is released. As described above, the restriction of forward/backward movement of forward/backward member 11 by lock portion 90 is released from outside of forward/backward movement device 1 by operating operation lever 85 via the cable.

Note that, when an external force in the backward direction is added to forward/backward member 11 in a state where the locked state of forward and backward movement of forward/backward member 11 is released, bent portion 292 of pin 29 moves to a path portion where bent portion 292 of pin 29 is guided from the forward side toward the backward side on the circumferentially extending path of guiding section 22. When the external force on forward/backward member 11 is eliminated, forward/backward-member-side member 21 slidingly moves by the repulsive force of spring 27 and then moves forward/backward member 11 to the forward position.

[Effects of Forward/Backward Movement Device 1]

According to forward/backward movement device 1 of the present embodiment, forward/backward member 11 and drive section 60 are housed in case 4 such that the respective axes (axes S1 and S2) of forward/backward member 11 and drive section 60 are substantially parallel to each other. Further, arm section 80 which transmits rotation of drive section 60 to lock portion 90, together with gear section 72, includes spindle 44 being a rotation axis. A plane containing the rotation direction of arm section 80 with the rotation axis is substantially parallel to a plane containing the axial direction of drive section 60 and the axial direction of forward/backward member 11.

Thus, arm section 80 and the movable region of arm section 80 are positioned so as to overlap with the arrangement region of forward/backward member 11 and drive section 60, and thus downsizing is achieved by reduction of the width of case 4 without arrangement of forward/backward member 11 and drive section 60 in the case width direction in which forward/backward member 11 and drive section 60 are aligned orthogonal to the forward/backward direction, and housing in a housing space which is narrow in width direction is made possible.

Further, in this embodiment, in case 4, forward/backward member 11 which moves forward and backward with respect to case 4, and drive section 60 of drive mechanism 30 which locks forward/backward member 11, are disposed adjacent to each other on the same axes S1 and S2. In addition, arm section 80 of drive mechanism 30 and the movable region of arm section 80 are arranged so as to overlap with the arrangement region of forward/backward member 11 and drive section 60. Further, in this embodiment, lock portion 90 is disposed between forward/backward member 11 and drive section 60, and arm section 80 and the movable region of arm section 80.

More specifically, the upper layer portion UL, which is the virtual layer containing drive section 60 and forward/backward member 11, is disposed on the lower layer portion LL including the first lower layer portion LL1, which is the virtual layer containing arm section 80, and the second lower layer portion LL2, which is the virtual layer containing lock portion 90, so as to overlap therewith.

In this embodiment, the driving force of drive mechanism 30 is transmitted from drive section main body 62 to lock portion 90 which moves between drive section main body 62 and arm section 80, via worm gear 68 of drive shaft 64, gear section 72 connected to worm gear 68, and arm section 80, which turns in the lowermost layer positioned on the side of the bottom surface relative to drive section main body 62. More specifically, the driving force of the drive mechanism is transmitted via a folded path in which the driving force is transmitted to the backward position side from the forward position side in the forward/backward direction from drive section main body 62, then is returned to the forward position side, and proceeds under the bottom surface side of drive section main body 62. Thus, downsizing in the forward/backward direction is achieved without requiring a transmission path of drive section 60 in the forward/backward direction.

Further, terminal 66 of drive section 60 and spring 27 for moving forward/backward member 11 forward and backward are disposed such that forward/backward member 11 and drive section 60 are positioned therebetween and so as to be included in the plane containing the axial direction of drive section 60 and the axial direction of forward/backward member 11.

As illustrated in FIG. 15, spring 27 and terminal 66 which do not require thickness relatively as compared with drive section 60 and forward/backward member 11 are disposed respectively on both sides of a center portion where the lower layer portion LL1 containing arm section 80, the lower layer portion LL2 containing lock portion 90, and the upper layer portion UL containing forward/backward member 11 and drive section 60 overlap with each other. Further, spring 27 and terminal 66 are disposed in the upper layer portion UL.

Accordingly, it is made possible to form outer surface 1a (see FIG. 6) of forward/backward movement device 1 itself in a curved shape in which a center portion in the width direction of case 4, i.e., in the width direction of forward/backward movement device 1 protrudes.

As described above, the thickness of forward/backward movement device 1 on both sides becomes smaller than the thickness of the center portion thereof in the width direction of case 4, and thus, downsizing of the entirety of forward/backward movement device 1 can be achieved.

For example, as illustrated in FIG. 1, even in a case where forward/backward movement device 1 is provided in opening/closing apparatus 100 which is inserted from the outside of a vehicle body and then attached to filler opening portion 2a of vehicle body 2, opening/closing apparatus 100 can be attached to filler opening portion 2a of vehicle body 2 without forward/backward movement device 1 becoming an obstacle during the attachment.

Figure 17:
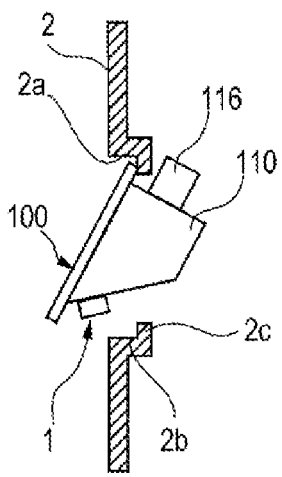
FIG. 17 is a diagram illustrating an attachment operation of the forward/backward movement device according to the embodiment of the present invention.
Figure 17:
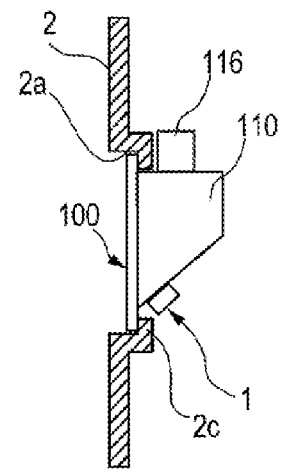

More specifically, as illustrated in FIG. 17, when opening/closing apparatus 100 is attached to filler opening portion 2a, flange 118 can be disposed on annular surface portion 2c without forward/backward movement device 1 touching an edge portion of filler opening portion 2a during an operation to attach flange 118 to annular surface portion 2c after supporting protrusion 116 is inserted into filler opening portion 2a. Moreover, by forming cover 5 to have a substantially elongated protruding shape or a substantially round shape in the thickness direction by forming cover 5 to be thick in the center portion in the width direction of case 4 and to be thin on both sides in the width direction, forward/backward movement device 1 can be disposed in a space having a narrow space in the width direction perpendicular to the forward/backward direction.

Drive section 60 is disposed with the protruding direction of drive shaft 64 from drive section main body 62 directed to the side of the backward position of forward/backward member 11, and a part of gear section 72 is disposed in the recess portion formed by drive section main body 62 and drive shaft 64, i.e., the drive-section shoulder space. Thus, downsizing in which the width in the perpendicular direction with respect to forward/backward member 11 has been further reduced is achieved.

Further, forward/backward member side member 21 includes guiding section 22 which controls forward/backward movement of forward/backward member 11. Accordingly, even with a configuration in which forward/backward member 11 moves forward and backward while rotating, a structure which controls forward/backward movement of forward/backward member 11 can be readily provided.

In this embodiment, although drive section 60 is disposed with the protruding direction of drive shaft 64 from drive section main body 62 directed to the side of the backward position of forward/backward member 11, drive section 60 may be disposed with the protruding direction of drive shaft 64 directed to the side of the forward position of forward/backward member 11.

Further, adopting a stick shaped body and/or the like for the cable to be connected to operation lever 85 to make the cable movable in the extension direction without bending makes it possible to move lock portion 90 via transmission member 70 including gear section 72 and arm section 80, by an operation to push or pull cable 150 (see FIG. 8) to the side of case 4. With this configuration, restriction and releasing of the restriction of forward/backward movement of forward/backward member 11 by lock portion 90 can be performed. Further, an activation section which directly activates drive shaft 64 or transmission member 70 by an operation from outside of forward/backward movement device 1 may be provided to activate drive shaft 64 or transmission member 70 without controlling of drive section 60. For example, as the activation section, gears or racks which are engaged with one of and the other of worm gear 68 and gear section 72 and which drive by an outside operation may be provided, and these gears or racks may be activated as appropriate from the outside of forward/backward movement device 1.

Note that, the present invention can be variously modified without being limited to the embodiment described above. For example, in the present embodiment, although the configuration in which the lock portion moves straight forward is illustrated, a configuration may be adopted in which the lock portion makes circular motion and is engaged with a forward/backward-member-side member.

INDUSTRIAL APPLICABILITY

The fuel lid opening/closing apparatus has been presented as the opening/closing apparatus by way of example. However, the forward/backward movement device according to the present invention can similarly be applied in a variety of flap-type opening/closing apparatuses. Further, the forward/backward movement device may be mounted into a variety of apparatuses without being limited to the opening/closing apparatus.

REFERENCE SIGNS LIST

1 Forward/backward movement device
2 Vehicle body
2a Filler opening portion
2b Step
4 Case
5 Cover
11 Forward/backward member 12 Latching section
13 Annular groove
14 Helical groove
20 Forward/backward position control mechanism
21 Forward/backward-member-side member
21e Overhanging piece
22 Guiding section
22a V-shaped portion
23 Fitting section
24 Recess portion (engaged portion)
25 Curved surface
26 Overhanging portion
27 Spring
28 Spring shaft
29 Pin
30 Drive mechanism
41 First holding section
42 Protrusion
43 Through hole
44 Spindle (rotation shaft)
45 Drive-section main-body holding section
46 Bearing
48 Lead-out hole
49 Fixing plate
49a Fitting hole
50 Third holding section
51 Second holding section
52 Spring housing section
54 Turn region section
60 Drive section
62 Drive section main body
64 Drive shaft
66 Terminal
68 Worm gear
68a Shaft portion
70 Transmission member
72 Gear section
75 Shaft hole
80 Arm section
81 Engagement protruding portion
85 Operation lever
852 Connection portion
90 Lock portion
91 Engaging section
91a Leading end portion
92 Lock main body
94 Conversion mechanism section
100 Opening/closing apparatus
110 Box main body
112, 114 Opening
116 Supporting protrusion
118 Flange
120 Fuel lid
130 Hinge
140 Latched section
160 Screw cap
291, 292 Bent portion

The invention claimed is:

1. A forward/backward movement device, comprising:
a case;
a forward/backward member which moves forward and backward with respect to the case; and
a drive mechanism which locks the forward/backward member, wherein
the drive mechanism includes:
a drive section including a drive section main body and a drive shaft;
a gear section which rotates, by rotation of the drive shaft, in a direction substantially perpendicular with respect to the drive shaft, as a rotation axis;
an arm section which rotates by rotation of the gear section; and
a lock portion including a conversion mechanism and an engaging section, the conversion mechanism being configured to change rotation of the arm section into linear motion, the engaging section being a section to be engaged with the forward/backward member, wherein
the forward/backward member and the drive section are housed in the case such that respective axes of the forward/backward member and the drive section are substantially parallel to each other, and
the arm section includes a rotation axis, wherein a plane perpendicular to the rotation axis is substantially parallel with respect to a plane containing an axial direction of the drive section and an axial direction of the forward/backward member, and
the lock portion is held between the forward/backward member and the arm section in a thickness direction parallel to the rotation axis of the arm section, and the lock portion slides in a direction perpendicular to the rotation axis of the arm section and in a direction that the engaging section extends out.

2. The forward/backward movement device according to claim 1, wherein the forward/backward member and the drive section are provided adjacent to each other.

3. The forward/backward movement device according to claim 1, wherein the gear section is disposed such that a part of the gear section is positioned in a recess portion formed by the drive section main body and the drive shaft.

4. The forward/backward movement device according to claim 1, wherein a terminal which supplies a power source to the drive section is provided on a side opposite to the forward/backward member with respect to the drive section.

5. The forward/backward movement device according to claim 1, comprising an operation section in connection with the gear section, wherein an engaged state of the lock portion in engagement with the forward/backward member is released by movement of the operation section.

6. The forward/backward movement device according to claim 1, wherein the lock portion is held between the drive section and the arm section in the thickness direction perpendicular to the plane parallel to the rotation axis of the arm section.

* * * * *